United States Patent

Yeomans

[11] 4,030,245
[45] June 21, 1977

[54] CHANNEL-SHAPED SEALING AND FINISHING STRIPS

[75] Inventor: Frederick G. Yeomans, Kenilworth, England

[73] Assignee: Draftex Development AG, Switzerland

[22] Filed: Jan. 12, 1976

[21] Appl. No.: 648,007

[30] Foreign Application Priority Data

Sept. 13, 1975 United Kingdom ............ 37729/75

[52] U.S. Cl. .................................. 49/490; 52/717
[51] Int. Cl.² ..................................... E06B 7/23
[58] Field of Search ............ 49/490, 491, 493, 496, 49/497; 52/716–718

[56] References Cited

UNITED STATES PATENTS 3,167,825  2/1965  Zoller ................................. 49/490
3,883,993  5/1975  Pullan ................................. 49/490

FOREIGN PATENTS OR APPLICATIONS 942,330  11/1963  United Kingdom ................. 49/490

Primary Examiner—Philip C. Kannan
Attorney, Agent, or Firm—Leydig, Voit, Osann, Mayer & Holt, Ltd.

[57] ABSTRACT

A sealing strip comprises a channel-shaped, metal reinforced resilient gripping portion, for embracing a flange or the like to be protected or sealed, and a longitudinally extending sealing portion running along the outside of the gripping portion. The sealing portion is attached to the gripping portion by means of a longitudinally extending support which is integral with the sealing portion and extends into the channel of the gripping portion. At its distal edge, the support has a head which locks onto a rib running along one internal wall of the channel near the channel base.

15 Claims, 4 Drawing Figures

CHANNEL-SHAPED SEALING AND FINISHING STRIPS

BACKGROUND OF THE INVENTION

The invention relates to flexible channel-shaped sealing, finishing and guide strips for use as draft excluding seals, beadings, flange finishers (for covering welded flanges and the like), and the like. Such strips are hereinafter generically referred to as "sealing strips".

Sealing strips are known comprising a channel-shaped gripping portion for embracing a flange or the like, such as the flange around a door opening in a vehicle body for example. It is also known to provide such sealing strips with a sealing portion running along the outside of the gripping portion. Therefore, when the gripping portion is mounted on the flange, the sealing portion is positioned adjacent the edge of the door opening defined by the flange, and the door closes sealingly onto the sealing portion. It is often a requirement for the sealing portion to be made of softer material (e.g., sponge rubber) than the covering of the gripping portion (which may be relatively hard plastics material). The gripping portion and the sealing portion may therefore be made of different materials and it is normal practice to make them separately and to secure them together with adhesive.

Such an adhesive securing step is time-consuming and expensive and complicates the manufacturing process.

It is therefore an object of the invention to provide an improved sealing strip.

A more specific object of the invention is to provide an improved sealing strip whose manufacture is simplified.

SUMMARY OF THE INVENTION

According to the invention, there is provided a sealing strip, comprising a longitudinal channel-shaped gripping portion having a longitudinally extending rib on at least one internal wall of the channel spaced from the base by a predetermined distance, a longitudinal sealing portion on and running along the outside of the gripping portion, the sealing portion being separate from the gripping portion, and a longitudinal support which extends at least partially over the outside of the said one wall of the channel of the gripping portion and into the said channel and has a longitudinally extending head which engages the distal end of the said rib on the said one wall to hold the gripping portion and the sealing portion together, the said predetermined distance being such that the head is held on the said rib by a flange which is embraced by, and onto which is pushed home, the gripping portion.

The rib is advantageous in that it provides a positive engagement for holding the support to the gripping portion.

BRIEF DESCRIPTION OF THE DRAWINGS

A sealing strip in the form of a flange finisher and embodying the invention will now be described, by way of example only, with reference to the accompanying drawing in which.

DESCRIPTION OF THE PREFERRED EMBODIMENTS

Figure 1:
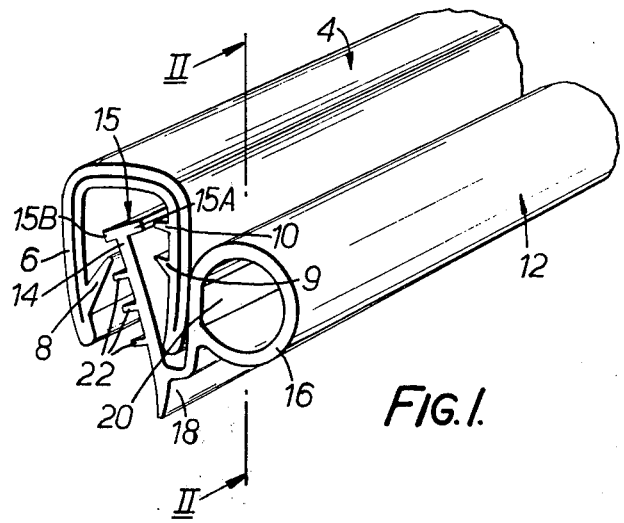
FIG. 1 is a perspective view of the sealing strip.
Figures 2, 2A:
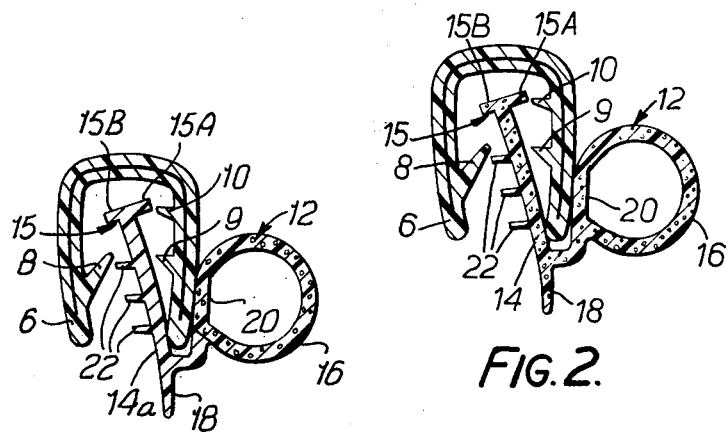
FIGS. 2 and 2a are sections on the line II–II of FIG. 1.

As shown in FIGS. 1 and 2, the sealing strip being described comprises a gripping portion 4 in the form of a U-shaped metal carrier 5 which is enclosed in a covering of flexible material 6 such as plastics material. The metal carrier 5 may comprise a series of U-shaped metal elements arranged side-by-side and either entirely disconnected or connected together by short connecting links. Instead, it may take any other suitable form. Whichever form is used, however, it is arranged such as to give the gripping portion 4 reasonable bending flexibility in a variety of directions.

The flexible covering 6 may be extruded onto the carrier 5.

The covering 6 is arranged so as to define a longitudinally extending rib 8 on one inside surface of te channel and two, somewhat smaller, longitudinally extending ribs 9 and 10 on the other inside surface of the channel and facing the rib 8.

In addition, the sealing strip has a sealing portion 12. The sealing portion 12 may be made of rubber and comprises a longitudinal support limb 14 which is integral with a hollow tubular part 16. The support limb 14 is somewhat of T shape in cross-section, with one end, 15, of the T inserted into the U of the gripping portion 4. The foot of the T of the limb 14 consists of a lip 18 extending outwards and slightly downwards with respect to the main boyd of the T, together with a longer extension 20 on the opposite side which extends outwardly and upwardly to the tubular section 16.

Three ribs 22 extend longitudinally along one face of the main body of the T of the limb 14. As shown in FIG. 2 the sealing portion 12 may be made entirely of sponge or cellular rubber. Instead, the limb 14a may be solid rubber while the tubular part 16 may be of sponge or cellular rubber, as shown in FIG. 22.

Figure 3:
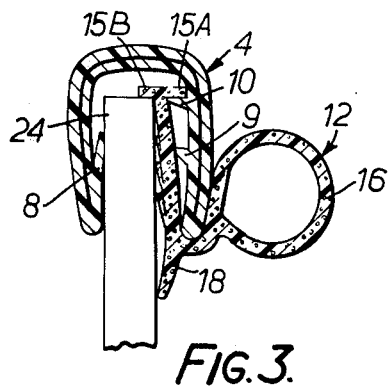
FIG. 3 is a view corresponding to FIG. 2 but showing the sealing strip fitted onto a flange.

FIG. 3 shows how the seal is fitted onto a flange 24, such as the flange surrounding the door opening in a vehicle body.

As shown in FIG. 3, the gripping portion 4 is placed over the flange 24 and pushed on to it so that one side of the flange engages one inner wall of the gripping portion 4 and the side of the gripping rib 8 thereon and the other side of the flange engages the body of the supporting limb 14. The gripping portion 4 is then pushed further on the flange until it attains the position shown in FIG. 3. In this position, the gripping portion 4 securely grips the flange and tightly holds the supporting limb 14 of the sealing portion 12. The portion 15A of the lip 15 on the limb 14 engages the rib 10, and the portion 15B of the lip engages the distal edge of the flange 24, and in this way the sealing section 12 is firmly held in position.

The lip 18 at the other end of the T limb 14 engages the side of the flange and lies in a direction pointing away from the opening of the U of the gripping portion 4.

In this way, the tubular seal 16 is held firmly so as to run along the outside of one side of the gripping portion 4. If the flange 24 is the flange around a door opening, the tubular seal 16 is therefore held in such a position as to provide an air and weathertight seal onto which the door of the opening closes.

The rib 9 of the gripping portion 4 helps to press the limb 14 towards the side of the flange 24, and the three ribs on the limb 14 provide a good seal on this side of the flange.

The structure is advantageous in that the sealing portion 12 does not have to be adhesively secured to the gripping portion 4 but is attached thereto by a simple assembly operation, its design being such that it is held securely in the correct position for delivery to the customer before assembly onto the flange. The avoidance of adhesive thus provides a saving in material as well as the saving in production time.

The method of manufacturing the gripping portion 4 may involve the extrusion of the plastic material 6 onto the carrier 5 while the latter is in flat form. The covered, flat, carrier is then passed between specially shaped rollers which bend it up into the channel form illustrated. During this forming operation, the sealing section 12 may be fed in, between the sides of the gripping portion 4 as they are being formed up into the shape shown, and these sides then trap the head of the T of the limb 14 and hold the sealing section 12 in position.

The construction illustrated is advantageous in that the rib 10, in cooperation with the lip 15A, securely locks the sealing section 12 in position in use. The lip 15B is of minimum thickness which is advantageous because it is desirable to avoid and undue mass of rubber between the flange and the base of the channel of the gripping portion 4; an undue mass of rubber makes assembly of the gripping portion 4 onto the flange difficult because too much rubber would tend to cause the gripping portion 4 to "bounce" on the flange when it is forced into position. In fact, because of the provision of the lip 15A and the rib 10, it is possible to dispense altogether with the lip 15B.

The lip 18 may be dispensed with if desired.

What is claimed is:

1. A channel-shaped sealing strip for straddling a flange or the like, comprising
   a longitudinal channel-shaped gripping portion having a longitudinally extending rib on at least one internal wall of the channel and spaced from the base of the channel by a predetermined distance,
   a longitudinal sealing portion on and running along the outside of the gripping portion, the contacting surfaces of the sealing portion and the gripping portion being unconnected at their points of contact, and
   a longitudinal support which extends at least partially over the outside of the said one wall of the channel of the gripping portion and into the said channel, is spaced from and movable relative to the said one wall of the cahnnel when the gripping portion is not straddling the said flange or the like, and has a longitudinally extending enlarged head which engages the distal edge of the said rib on the said one wall to hold the gripping portion and the sealing portion together,
   the said predetermined distance being such that the head is held on the said rib by the said flange or the like when the latter is embraced, by, and has pushed home onto it, the gripping portion, thereby preventing separation of the gripping and sealing portions, the head being held spaced from the base of the channel.

2. A sealing strip according to claim 1, in which the gripping portion has a further rib extending along the said one internal wall of the channel but closer to the channel opening than the first-mentioned rib thereon, the further rib being positioned to engage one side of the longitudinal support.

3. A sealing strip according to claim 1, in which the said head is shaped so as to be engaged by the free edge of the flange, as well as by the said first-mentioned rib.

4. A sealing strip according to claim 1, in which the side of the longitudinal support facing the other internal wall of the channel is provided with a least one longitudinal rib or serration.

5. A sealing strip according to claim 1, in which the longitudinal support is T-shaped in corss-section with the head of the T constituting the longitudinally extending head.

6. A sealing strip according to claim 1, in which the support carries a longitudinally extending sealing lip which contacts and seals against one of the sides of the flange and is directed away from the opening of the channel of the gripping portion.

7. A sealing strip according to claim 1, in which a longitudinally extending seal running along the outside of the said one wall of the channel of the gripping portion is carried by said longitudinal support.

8. A sealing strip according to claim 7, in which the longitudinally extending seal is of hollow tubular form.

9. A sealing strip according to claim 1, in which the longitudinal support and the sealing portion are made of rubber.

10. A sealing strip according to claim 9, in which the rubber is sponge rubber.

11. A sealing strip according to claim 9, in which the support is made of solid rubber and the sealing portion is made of sponge rubber.

12. A sealing grip according to claim 1, in which the gripping portion comprises channel-shaped metal reinforcement covered with flexible covering material such as elastomeric material.

13. A channel-shaped sealing strip, comprising
   a channel-shaped gripping portion made of metal carrier means of U-shape in cross-section and enclosed in flexible material, with the flexible material defining at least one rib running longitudinally along one internal wall of the channel adjacent the base thereof and a second rib running longitudinally along the opposite internal wall of the channel,
   a longitudinal sealing portion made of sponge rubber on and running along the outside of the gripping portion, the contacting surfaces of the gripping and sealing portions being unconnected at their points of contact,
   a longitudinal rubber support integral with the sealing portion and extending at least partially over the outside of the said one wall of the channel of the gripping portion and into the said channel towards the base thereof, and being spaced from the said one wall of the gripping portion,
   a longitudinally extending enlarged head on the support adjacent the base of the channel of the gripping portion,
   a flange extending into the gripping portion for protection and embracing thereby,
   the said head being held on the said one rib and between the latter and the base of the channel by the said flange, so as to prevent separation of the gripping and sealing portions, the head being held spaced from the channel base, and
   a longitudinally extending sealing lip integral with the said support and extending parallel to the said head but spaced therefrom by the height of the support so as to make contact with and seal against one of the sides of the flange and being angled relative to the flange so as to be directed away from the base of the channel.

14. A sealing strip according to claim 13, in which the said head extends widthwise across the channel so as also to be engaged by the distal edge of the flange adjacent the base of the channel.

15. A sealing strip according to claim 13, in which the elastomeric material of the gripping portion defines a third rib which runs longitudinally along the said one internal wall of the channel and parallel to the said one wall thereon but closer to the mouth of the channel, so as to engage a side of the said support.

* * * * *